US008389895B2

(12) United States Patent  
Reichenbach et al.

(10) Patent No.: US 8,389,895 B2
(45) Date of Patent: Mar. 5, 2013

(54) METHOD AND APPARATUS FOR RELIABLY LASER MARKING ARTICLES (75) Inventors: Robert Reichenbach, Portland, OR (US); Jeffrey Howerton, Portland, OR (US); Jeffrey Albelo, Portland, OR (US)

(73) Assignee: Electro Scientifix Industries, Inc., Portland, OR (US)

( * ) Notice: Subject to any disclaimer, the term of this patent is extended or adjusted under 35 U.S.C. 154(b) by 233 days.

(21) Appl. No.: 12/823,895

(22) Filed: Jun. 25, 2010

(65) Prior Publication Data

US 2011/0315667 A1 Dec. 29, 2011

(51) Int. Cl.
B23K 26/08 (2006.01)
(52) U.S. Cl. ......... 219/121.78; 219/121.69; 219/121.73
(58) Field of Classification Search ............. 219/121.68, 219/121.69, 121.73, 121.78; 216/65
See application file for complete search history.

(56) References Cited

U.S. PATENT DOCUMENTS

| 5,260,542 | A | * | 11/1993 | Ishiguro et al. | .......... 219/121.68 |
|---|---|---|---|---|---|
| 5,751,585 | A | | 5/1998 | Cutler et al. | |
| 6,777,098 | B2 | | 8/2004 | Yeo | |
| 2005/0045586 | A1 | * | 3/2005 | Ellin et al. | ....................... 216/65 |
| 2005/0226287 | A1 | * | 10/2005 | Shah et al. | ....................... 372/25 |
| 2006/0054608 | A1 | | 3/2006 | Cahill et al. | |
| 2008/0206520 | A1 | * | 8/2008 | Il et al. | ............................ 428/172 |
| 2009/0032506 | A1 | * | 2/2009 | McMurtry et al. | ........ 219/121.68 |
| 2010/0253760 | A1 | * | 10/2010 | Audouard et al. | ............ 347/225 |

FOREIGN PATENT DOCUMENTS

| WO | WO03/061891 A2 | 7/2003 |
|---|---|---|
| WO | WO2006/109020 A1 | 10/2006 |

OTHER PUBLICATIONS

Fauchet, P.M., et al.; Surface ripples on silicon and gallium arsenide under picosecond laser illumination; Applied Physics Letters, 40(9); May 1, 1982; pp. 824-826; American Institute of Physics, College Park, MD.
Fauchet, P.M.; Gradual surface transitions on semiconductors induced by multiple picosecond laser pulses; Physics Lettters vol. 93A, No. 3, Jan. 3, 1983; pp. 155-157; North-Holland, Elsevier, Amsterdam, NL.
Young, J.F. et al.; Regimes of laser-induced periodic surface structure on germanium: radiation remnants and surface plasmons; Optics Letters, vol. 8, No. 8, Aug. 1983; pp. 431-433; Optical Society of America, Washington, DC.
Maja, P. et al.; Dry laser cleaning of anodized aluminum; COLA '99—5th International Conference on Laser Ablation; Jul. 19-23, 1999; pp. S43-S46; Göttingen, Germany.
Banishev, A.F., et al.; Laser-induced radiative rising of defect on the surface and metal surface destruction; Applied Surface Science, vol. 153, Jan. 1, 2000, pp. 166-171; Elsevier, Amsterdam, NL.
Ohno, Y.; CIE fundamentals for color measurements; IS&T NIP16 Conference, Oct. 16-20, 2000; Vancouver, CN; pp. 540-545.
Ng, T.W., et al.; Aesthetic laser marking assessment using luminance ratios; Optics and Lasers in Eng. vol. 35, Iss. 3, Mar. 2001; pp. 177-186; Elvsevier, Amsterdam, NL.

(Continued)

Primary Examiner — Thinh T Nguyen (57) ABSTRACT

The invention is a method and apparatus for laser marking a stainless steel specimen with commercially desirable marks. The method includes providing a laser processing system having a laser, and laser optics and a controller with pre-determined laser pulse parameters, selecting the pre-determined laser pulse parameters associated with the desired mark, and directing the laser marking system to produce laser pulses having laser pulse parameters associated with the desired marks including temporal pulse widths greater than about 1 and less than about 1000 picoseconds.

18 Claims, 12 Drawing Sheets

OTHER PUBLICATIONS

Borowiec, A. et al.; Subwavelength ripple formation on the surfaces of compound semiconductors irradiate with femtosecond laser pulses, Applied Physics Letters, vol. 82, No. 25; Jun. 23, 2003, pp. 4462-4464; North-Holland, Elsevier, Amsterdam, NL.

Szabelski, P.; Modeling of surface roughening induced by laser ablation; Applied Surface Science, vol. 219, iss. 3-4, Dec. 15, 2003, pp. 300-310; Elvsevier, Amsterdam, NL.

Wang, J. et al.; Ultrafast dynamics of femtosecond laser-induced periodic surface pattern formation on metals;Optics Letters 87; Dec. 13, 2005; ; pp. 251914-1-251914-3; American Institute of Physics, College Park, MD.

Wagner, R., et al.; Subwavelength ripple formation induced by tightly focused femtosecond laser radiation; Applied Surface Science; vol. 252, Iss. 24, Oct. 2006; pp. 8576-8579; Elvsevier, Amsterdam, NL.

ESI; Model 5330 Laser Drilling System Service Guide; Part No. 147250-01a; May 2007; Electro Scientific Industries, Inc., Portland OR 97229.

Zhao, Q. Z., et al.; Formation of subwavelength periodic structures on tungsten induced by ultrashort laser pulses; Optics Letters, vol. 32, No. 13; Jul. 1, 2007; pp. 1932-1934; Optical Society of America, Washington, DC.

Vorobyev, A.Y., et al.; Colorizing metals with femtosecond laser pulses; Appl. Phys. Letters; vol. 92, Jan. 31, 2008; pp. 41914-1-41914-3; American Institute of Physics, College Park, MD.

Hainsey, R.F., et al.; Femtosecond laser system integration and application development; ICALEO, Oct. 20-23, 2008; M402; Laser Institute of America, Orlando,FL.

International Search Report and Written Opinion of PCT/US2011/041745, 4 pages.

\* cited by examiner

Fluence Thresholds for 1064 nm Wavelength

Fig 8

METHOD AND APPARATUS FOR RELIABLY LASER MARKING ARTICLES

TECHNICAL FIELD

The present invention relates to laser marking metal articles. In particular it relates to marking stainless steel with a laser processing system. More particularly it relates to marking stainless steel in a durable and commercially desirable fashion with a laser processing system. Specifically it relates to characterizing the interaction between infrared wavelength picosecond laser pulses and the stainless steel surface to identify laser parameters which will reliably and repeatably create durable marks with a desired optical density.

BACKGROUND OF THE INVENTION

Marketed products commonly require some type of marking on the product for commercial, regulatory, cosmetic or functional purposes. Desirable attributes for marking include consistent appearance, durability, and ease of application. Appearance refers to the ability to reliably and repeatably render a mark with a selected shape, color and optical density. Durability is the quality of remaining unchanged in spite of abrasion to the marked surface. Ease of application refers to the cost in materials, time and resources of producing a mark including programmability. Programmability refers to the ability to program the marking device with a new pattern to be marked by changing software as opposed to changing hardware such as screens or masks.

Stainless steel, which is strong, and has a durable surface finish, has many applications in industrial and commercial goods. Many articles manufactured out of metals such these as are in need of permanent, visible, commercially desirable marking. Stainless steel is an exemplary material that has such needs. Metals such as stainless steel which resist corrosion can be marked in this fashion. Marking stainless steel with laser pulses produced by a laser processing system can make durable marks quickly at extremely low cost per mark in a programmable fashion.

Creating color changes on the surface of stainless steel with laser pulses has been reported in the literature. One mechanism which has been put forth to explain the change in optical density or color of metallic surfaces is the creation of laser-induced periodic surface structures (LIPSS). The article "Colorizing metals with femtosecond laser pulses" by A. Y. Vorobyev and Chunlei Guo, Applied Physics Letters 92, (041914) 2008, pp 41914-1 to 141914-3 describes various colors which may be created on metals using femtosecond laser pulses. This article describes making black or gray marks on metal and creating a gold color on metal. Some other colors are mentioned but no further description is made. LIPSS is the only explanation offered for the creation of marks on metallic surfaces. Further, only laser pulses having temporal pulse widths of 65 femtoseconds are taught or suggested to create these structures.

Two articles discuss using picosecond laser pulses to create surface changes on semiconductor materials and metals. The articles SURFACE RIPPLES ON SILICON AND GALLIUM ARSENIDE UNDER PICOSECOND LASER ILLUMINATION, authors P. M. Fauchet and A. E. Siegman, Appl. Phys. Lett. 40(9), 1 May 1982, pp 824-826, and GRADUAL SURFACE TRANSITIONS ON SEMICONDUCTORS INDUCED BY MULTIPLE PICOSECOND LASER PULSES, author P. M. Fauchet, Physics Letters, Vol. 93A, No. 3, 3 Jan. 1983 both describe in detail the changes that occur on semiconductor and metal surfaces when subject to infrared and visible wavelength picosecond laser pulses. These articles describe how ripples form on the surface of these materials but do not discuss how the appearance of the material changes as a result of laser interaction.

Another problem with reliably and repeatably producing marks with desired color and optical density in stainless steel is that the energy required to create very dark marks with readily available nanosecond pulse width solid state lasers is enough to cause damage to the metal, an undesirable result. "Darkness" or "lightness" or color names are relative terms. A standard method of quantifying color is by reference to the CIE system of colorimetry. This system is described in "CIE Fundamentals for Color Measurements", Ohno, Y., IS&T NIP16 Conf, Vancouver, CN, Oct. 16-20, 2000, pp 540-545. In this system of measurement, achieving a What is desired but undisclosed by the art is a reliable and repeatable method of making commercially desirable black marks on stainless steel that does not require an expensive femtosecond laser or ablate the surface of the metal. What is needed then is a method for reliably and repeatably creating marks having a desired optical density on stainless steel using a lower cost laser, without causing undesired damage to the surface or requiring cleaning prior to anodization.

SUMMARY OF THE INVENTION

An embodiment of this invention creates a mark with desired properties on a stainless steel specimen using a laser marking system. The laser marking system has a laser which produces laser pulses having laser pulse parameters which control the laser fluence and laser beam positioning and therefore the laser dose to which the specimen is exposed. Laser parameters associated with the optimal marking range for a particular specimen are determined and stored in the laser processing system. The system is then directed to mark the specimen by directing laser pulses to impinge the specimen using the stored laser pulse parameters to expose the specimen to laser doses within the optimal marking range and thereby mark the specimen with commercially desirable marks.

To achieve the foregoing with these and other aspects in accordance with the purposes of the present invention, as embodied and broadly described herein, a method for creating a visible mark with desirable commercial qualities on a stainless steel specimen and apparatus adapted to perform the method is disclosed herein. Included is a laser processing system having a laser, laser optics, and motion stages all operatively connected to a controller with stored, predetermined laser pulse parameters. Stored laser pulse parameters associated with the desired color and optical density mark are selected which direct the laser marking system to produce laser pulses which expose the stainless steel specimen to laser doses associated with the desired color and optical density and thereby create marks with commercially desirable properties.

DETAILED DESCRIPTION OF PREFERRED EMBODIMENTS

An embodiment of this invention marks stainless steel articles with durable, visible marks with commercially desirable color and optical density. This is done by using picosecond laser pulses with laser parameters predetermined to expose the area to be marked with a laser dose within a range that has been determined to create the marks with desirable commercial properties. The picosecond laser pulses create commercially desirable marks by altering the properties of the surface without causing significant damage or adding material to the surface, thereby making the marks durable. Durable, commercially desirable marks are created on stainless steel by controlling the laser parameters which create and direct picosecond laser pulses. One embodiment of this invention is a laser processing system adapted to produce laser pulses with appropriate parameters in a programmable fashion. Exemplary laser pulse parameters which may be selected to improve the reliability and repeatability of laser marking stainless steel include laser type, wavelength, pulse duration, pulse repletion rate, number of pulses, pulse energy, pulse temporal shape, pulse spatial shape, focal spot size and focal spot shape. Additional laser pulse parameters include specifying the location of the focal spot relative to the surface of the article and in particular directing the relative motion of the laser pulses with respect to the article in coordination with the laser pulses repetition rate and timing to determine the spacing between successive pulses (bite size) and the spacing between parallel rows of laser pulses (pitch).

Laser pulse parameters are selected to control the total laser radiation dose delivered to the surface of the article to be marked. Producing laser marks on stainless steel with commercially desirable properties is dependent upon the total laser radiation dose exposure. Laser radiation dose is defined as the total amount of laser radiation delivered to the surface of the article being marked as measured in Joules. Measurement of the energy contained in a single laser pulse is relatively straightforward, as is calculation of laser fluence in Joules/cm$^2$ for a single pulse. Due to complex geometries associated with typical marking schemes that require multiple overlapping laser pulses at each point, direct measurement or calculation of laser dose is very difficult. Laser radiation dose is a function of laser pulse fluence and laser pulse geometry which includes properties such as spot size, focal distance, laser beam positioning, bite size and pitch. Both fluence and geometry affect laser dose. Changing these parameters changes the dose of laser radiation which reaches a given location on the surface of the workpiece and thereby changes the appearance of the mark. Due to complex geometries created by the overlaps in bite sizes and pitches smaller than the radius of the spot size on the workpiece, measurement or calculation of the actual dose delivered to a workpiece in practical situations can be difficult. Laser dose, for a given set of laser beam positioning parameters, is proportional to laser fluence. For this reason, laser exposure is often discussed in terms of laser fluence rather than dose, with the understanding that the results are proportional. Typically in order to determine the effective laser exposure to use, a beginning laser fluence and set of laser positioning parameters is selected and then the correct dose is determined experimentally by varying the parameters associated with speed, bite size, pitch and height of focal spot above the workpiece to determine the optimal laser parameters to use for a given sample of stainless steel. If no reasonable set of laser positioning parameters results in a desirable mark, then the laser fluence can be adjusted and the experiment repeated.

Embodiments of this invention create durable, commercially desirable marks by darkening the surface of the stainless steel with optical densities which range from nearly undetectable with the unaided eye to black depending upon the particular laser pulse parameters employed. Laser pulse parameters are determined to provide a particular range of laser doses which are greater than the threshold for creating changes in the surface but less than the threshold for creating large ripples or damage. Exposing stainless steel to laser doses in this optimal marking range creates uniform, dark, commercially desirable marks by creating small, high frequency ripples within existing grain boundaries on the surface of the stainless steel. Exposing stainless steel to laser doses in excess of this optimal marking range creates larger, lower frequency ripples at right angles to the higher frequency ripples as reported in the references that obliterate grain boundaries and create diffraction effects. Laser marks created according to aspects of this invention are indicated by high frequency ripples and the continued presence of grain boundaries, with some lower frequency ripples possibly beginning to form but not well enough organized to remove the grain boundaries.

Embodiments of this invention perform marking on stainless steel. Stainless steel used for this experiment was of type SAE grade 304-O, finished with a high polish finish that tends to remove grit associated with the initial finishing steps and leaves a highly reflective surface. Assuming that factors associated with laser positioning are held constant, the laser fluence F, defined by:

$$F = E/a$$

where E is laser pulse energy in Joules and a is the area of the spot size on the substrate in square centimeters, must be in the proper range to cause desired changes in the stainless steel surface. In order for the fluence, F to be in the optimal marking range, it must satisfy the relation $F_u < F < F_r < F_s$, where $F_u$ is the laser modification threshold of the stainless steel substrate, where small, high frequency ripples begin to form within grain boundaries on the surface; $F_r$ is the threshold at which large, low frequency ripples begin to form and obliterate grain boundaries; and $F_s$ is the damage threshold for the surface layer where material begins being ablated from the surface. $F_u$, $F_r$ and $F_s$ have been obtained experimentally and represent the fluence of the selected laser at which the substrate surface layer begins to show signs of being modified by the laser energy ($F_u$), where the substrate surface layer becomes organized into large ripples that remove grain boundaries ($F_r$) and where damage that interferes with the marking begins ($F_s$). For 10 picosecond (ps) IR pulses, exemplary values of $F_u$ for stainless steel is about 47 mJ/cm$^2$, $F_r$ is about 62 mJ/cm$^2$ and $F_s$ is about 73 mJ/cm$^2$. Using fluences in the optimal marking range will produce commercially desirable marks at some speeds, bite sizes and pitches in the ranges listed in Table 1.

TABLE 1

| Laser parameters | |
|---|---|
| Laser Type | DPSS Nd:YVO$_4$ |
| Wavelength | 1064 nm |
| Pulse duration | 10 picoseconds |
| Pulse temporal | Gaussian |
| Laser power | 7 W max |
| Rep Rate | 200 KHz |
| Polarization | Linear |

TABLE 1-continued

Laser parameters

| | |
|---|---|
| Speed | 300 mm/s |
| Bite size | 1.5 microns |
| Pitch | 10 microns |
| Spot size | 130 microns |
| Spot shape | Gaussian |
| Fluence | .05 J/cm$^2$ |
| Focal Height | 4.6 mm +/− 0.1 mm step size |

Marking stainless steel according to embodiments of this invention in the fluence range indicated above appears to be a function of the metal grain. Grain boundaries separate areas on the surface of the metal where the crystalline structure is generally homogeneous. It is known that laser/material interaction in this fluence range shows a dependence on polarization. We observed, however, a previously unreported interaction between metallic crystals or grain, wherein the small ripples created within grain boundaries seemed to show a dependence upon the relationship between grain direction within grain boundaries and polarization, with some grain regions being more susceptible to laser radiation than other regions.

An embodiment of the instant invention uses an adapted laser processing system to mark stainless steel articles. An exemplary laser processing system which can be adapted to mark stainless steel articles is the ESI Model MM5330 laser micromachining system, manufactured by Electro Scientific Industries, Inc., Portland, Oreg. 97229. According to the specifications found in the Model 5330 Service Guide, document no. 147250-01a, May 2007. Electro Scientific Industries, Inc. Portland Oreg. 97229, included herein by reference, this system is a laser micromachining system employing a variety of diode-pumped Q-switched solid state lasers with an average power of up to 11 W at 90 K Hz pulse repetition rate at 355 nm UV wavelength. This laser may be adapted to produce laser pulses with duration of about 1 ps to 1000 ps, or preferably between 1 ps and 250 ps or more preferably between 10 ps and 100 ps. The laser power can range from about 1 W to about 100 W, preferably between about 1 W and 50 W or more preferably between 5 W and 25 W. These lasers operate at a rep rate of between about 1 KHz to about 100 MHz, preferably between about 1 KHz and 1 MHz or more preferably between about 10 KHz and 100 KHz. The adapted laser system can direct the laser beam to move with respect to the specimen at a speed (also known as a "scan speed") ranging from about 1 mm/s to about 1 m/s, preferably between about 50 mm/s and about 500 mm/s, more preferably between about 100 mm/s and about 400 mm/s. The bite size or spacing between subsequent laser pulses on the surface of the specimen can range from about 1 micron to about 1 mm, preferably between about 1 micron and about 500 microns, or more preferably between about 1 micron and about 100 microns. The system typically operates with a pitch, or distance between adjacent lines of laser pulse locations, of between about 1 micron to about 1 mm, or preferably between about 1 micron and about 500 microns or more preferably between about 1 micron and about 100 microns. The system is configured to focus the laser pulses down to a minimum focal spot size of between about 10 microns to about 500 microns, preferably between about 50 microns and 250 microns, more preferably between about 100 microns and about 200 microns. The system is configured to emit laser pulses with fluence of between about 0.01 J/cm2 to about 100 J/cm2, preferably between about 0.1 J/cm2 to about 25 J/cm2, more preferably between about 0.1 J/cm2 to about 10 J/cm2.

The system can also be configured to emit second harmonic doubled 532 nm wavelength pulses or third harmonic 355 nm wavelength pulses. This system may be adapted by the application of appropriate laser, laser optics, parts handling equipment and control software to reliably and repeatably produce marks in stainless steel surfaces according to the methods disclosed herein. These adaptations permit the laser processing system to direct laser pulses with the appropriate laser parameters to the desired places on an appropriately positioned and held stainless steel article at the desired rate and pitch to create the desired mark with desired color and optical density. An embodiment of this invention comprises adaptations which permit the laser processing system to direct laser pulses with laser parameters as listed in Table 1. A diagram of such an adapted system is shown in FIGS. 1a and b.

Figure 1A:
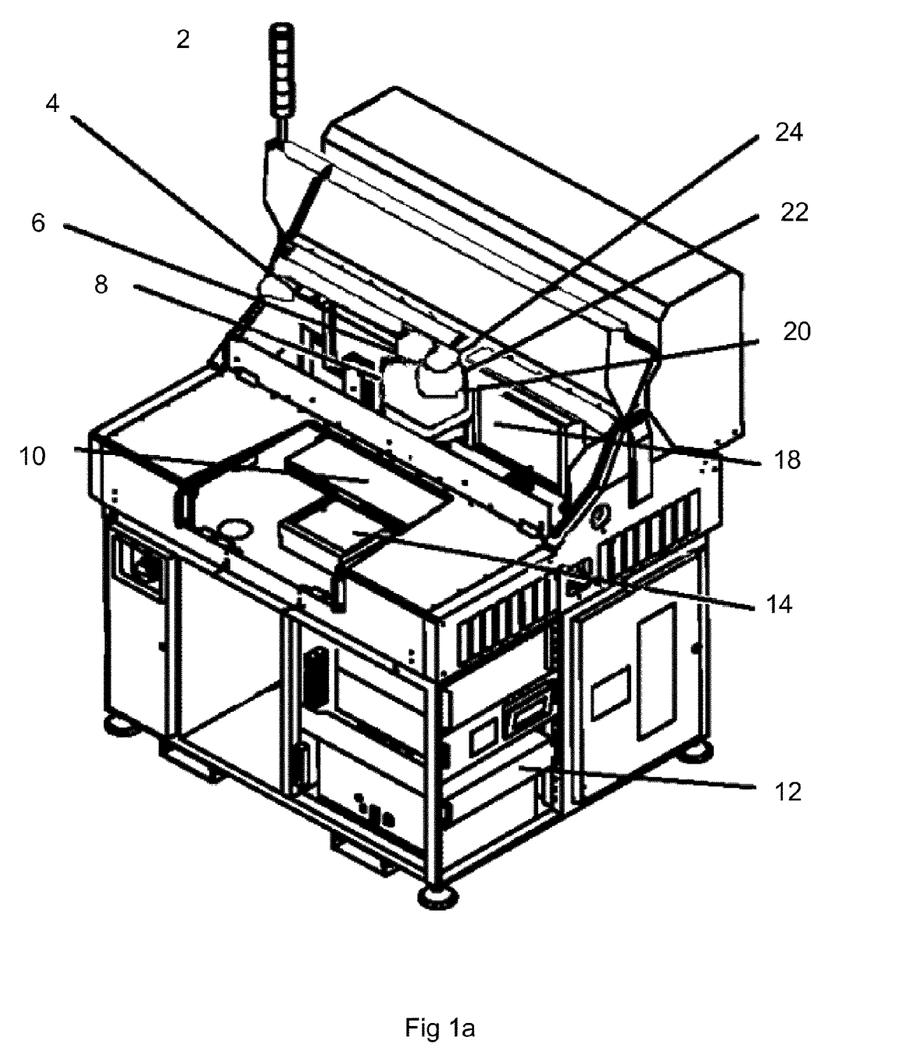
FIGS. 1a and b. Adapted laser marking system.
Figure 1B:
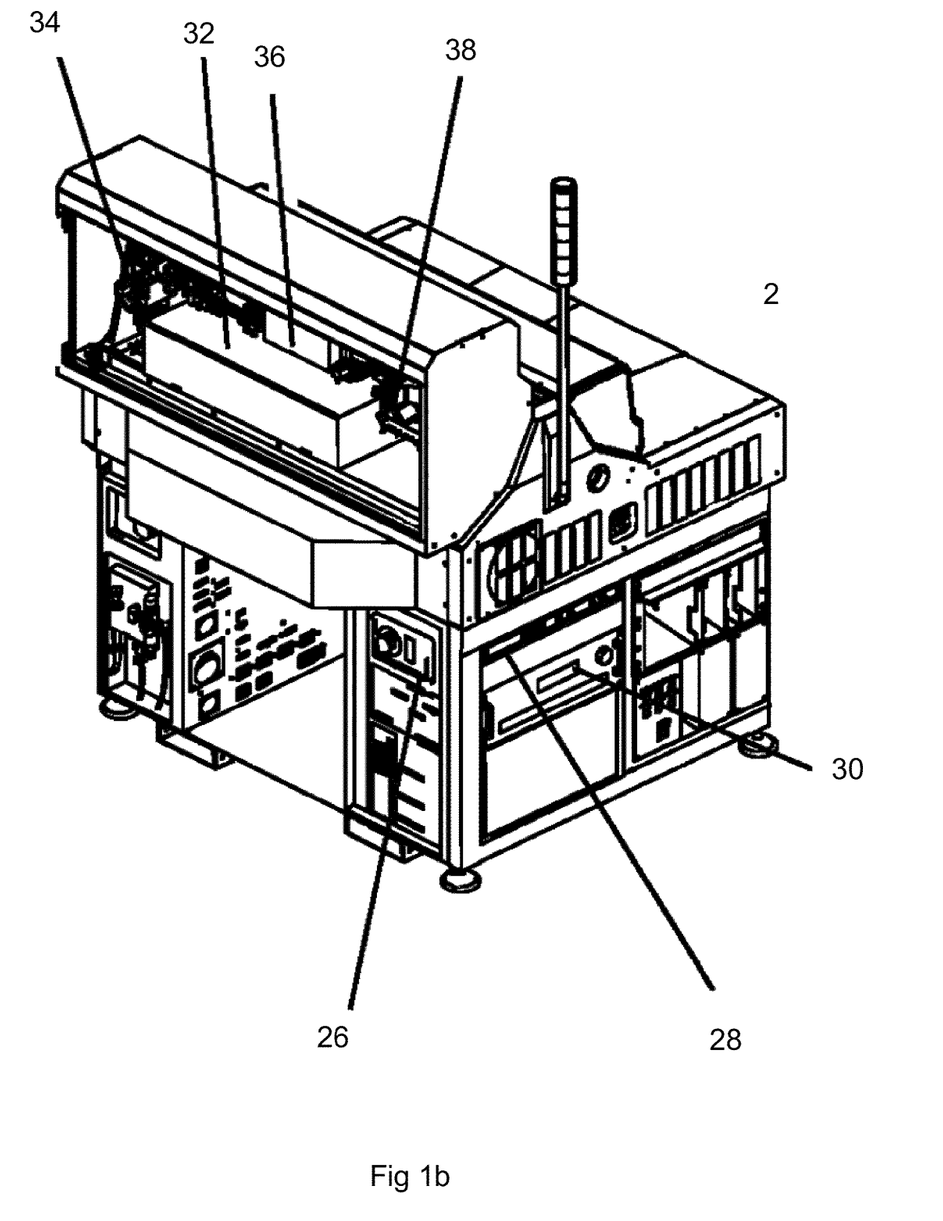

FIG. 1a shows a diagram of an adapted ESI Model MM5330 laser micromachining system 2 adapted for marking articles as an embodiment of the instant invention. Adaptations include a laser mirror and power attenuator 4, a laser beam steering optics 6 and laser field optics 8 adapted to handle the laser wavelength, power and beam sizes of this embodiment, a chuck 10 adapted to fixture stainless steel specimens, a controller 12 adapted to store and direct the system to emit laser pulses according to specifications in Table 1, a Y stage 14, an X stage 18, and a Z stage (optics stage) 20 adapted to move the fixtured stainless steel article with respect to the laser beam focal spot according to the specifications in Table 1 and a camera 22 and viewing optics 24 adapted to align and inspect the stainless steel specimen.

FIG. 1b shows another view of an adapted ESI Model MM5330 laser micromachining system 2, including a laser interlock controller 26 that controls the operation of the interlock sensors (not shown) which prevent operation of the laser when various panels of the system are opened, controller 28, laser power supply 30, laser beam collimator 32, laser beam optics 34 and laser mirror 36, all of which have been adapted to work with the adapted laser 38 which is a diode pumped Nd:YVO$_4$ solid state laser operating at 1064 nm wavelength, model Rapid manufactured by Lumera Laser GmbH, Kaiserslautern, Germany. The laser 38 is configured to yield up to 6 W at a 2 MHz pulse repetition rate. The laser 38 produces laser pulses with duration of 1 to 1,000 picoseconds in cooperation with controller 28, and laser power supply 30. These laser pulses may be Gaussian or specially shaped by the laser beam optics 34. The laser optics 34, in cooperation with the controller 28, laser beam steering optics 6 and laser field optics 8 cooperate to direct laser pulses to form a laser spot on a stainless steel specimen (not shown) fixtured by chuck 10. Motion control elements Y stage 14, X stage 18, Z stage (optics stage) 20 and laser beam steering optics 6 combine to provide compound beam positioning capability, one aspect of which is the ability to position the laser beam with respect to the specimen while the specimen is in continuous motion with respect to the laser beam. This capability is described in U.S. Pat. No. 5,751,585, inventors Donald R. Cutler, Robert M. Pailthorp and Mark A. Unrath, issued May 12, 1998 assigned to the assignee of this invention and which is incorporated herein by reference. Compound beam positioning includes the ability to mark shapes on a specimen while the specimen is in relative motion to the laser beam by having the controller 28 direct some portion of the motion control elements, namely Y stage 14, X stage 18, Z stage 20 and laser beam steering optics 6 to compensate for continuous relative motion induced by other portions of the motion control elements.

The laser pulses (not shown) are also shaped by the laser beam optics 34 in cooperation with controller 28. The laser beam optics 34 direct the laser pulses' spatial shape, which may be Gaussian or specially shaped. For example, a "top hat" spatial profile may be used which delivers a laser pulse having an even distribution of fluence over the entire spot area which impinges the article being marked. Specially shaped spatial profiles such as this may be created using diffractive optical elements or other optical elements. The laser spot size refers to the size of the focal spot of the laser beam. The actual spot size on the surface of the specimen being marked may be different due to the focal spot being positioned above or beneath the surface. In addition, the laser beam optics 34, laser beam steering optics 6, laser field optics 8 and Z stage (optics stage) 20 cooperate to control the depth of focus of the laser spot, or how quickly the spot goes out of focus as the point of intersection on the specimen moves away from the focal plane. By controlling the depth of focus, the controller 28 can direct the laser beam optics 34, laser beam steering optics 6, laser field optics 8 and Z stage (optics stage) 20 to position the laser spot either at or near the surface of the specimen repeatably with high precision. Making marks by positioning the focal spot above or below the surface of the article allows the laser beam to defocus by a specified amount and thereby increase the area illuminated by the laser pulse and decrease the laser fluence at the surface. Since the geometry of the beam waist is known, precisely positioning the focal spot above or below the actual surface of the article will provide additional precision control over the spot size and fluence. It was discovered that altering the laser fluence by altering the laser spot geometry by positioning the focal spot combined with the use of picosecond lasers, which produce laser pulse widths in the range from 1 to 1,000 picoseconds, is a way to reliably and repeatably create marks on stainless steel. An advantage of using picosecond lasers is that they are much less expensive, require much less maintenance, and typically have much longer operating lifetimes than prior art femtosecond lasers.

FIGS. 2a through 2f are scanning electron micrographs of laser marks on stainless steel created according to an embodiment of this invention. FIGS. 2a-2f represent laser marks formed at fluences which range from 47 mJ/cm$^2$ to 62 mJ/cm$^2$. In this case, fluence was altered by changing the height of the focal spot above the workpiece. Changing the height of the focal spot with respect to the surface of the workpiece causes the laser beam to appear to de-focus at the surface, thereby spreading the laser energy over a larger area and reducing the effective fluence at the surface. Changing the height of the focal spot above or below the surface is a rapid, reliable and precise way to adjust laser fluence over the ranges desired by embodiments of this invention. Other methods of altering the fluence include changing the pulse duration, changing the laser power, changing the speed at which the laser beam is moving with respect to the workpiece, changing the rep rate, or bite size. Changes in laser parameters which change the fluence or ultimately the dose delivered to the surface of the specimen will alter the appearance of the resulting mark.

Figure 2A:
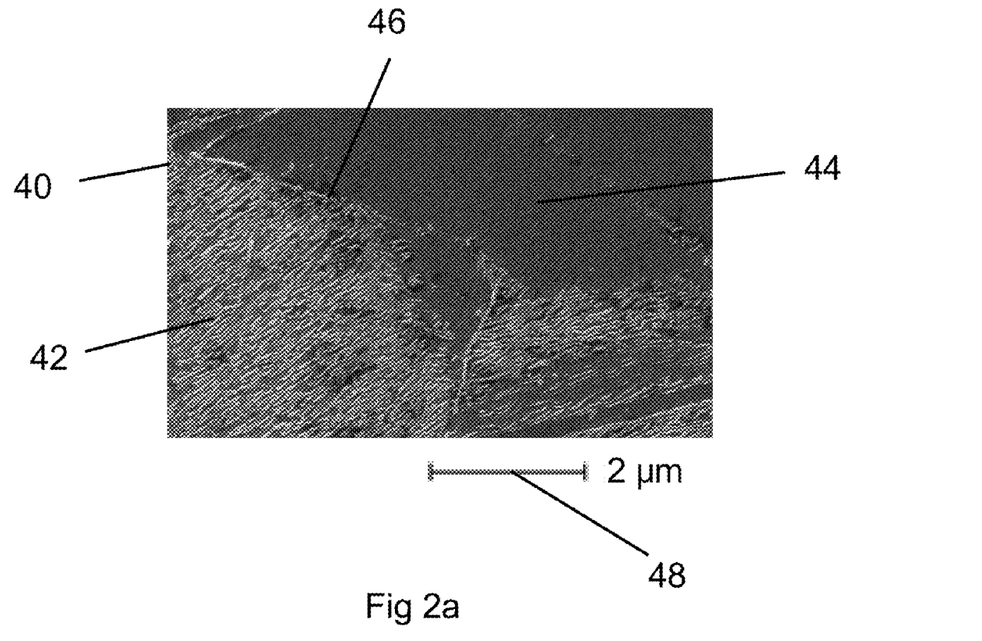
FIGS. 2a-f. SEM images of laser mark on stainless steel.
Figure 2B:
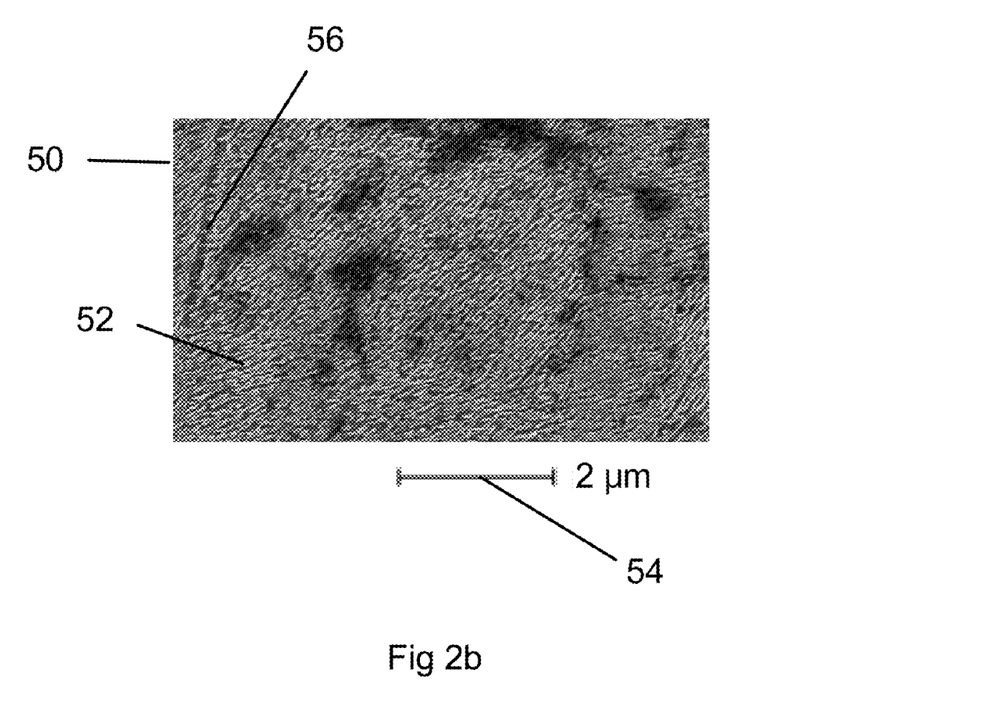

FIGS. 2a through 2f show marks created by altering the height of the focal spot from about 5.5 mm above the surface of the article being marked down to about 4.5 mm above the surface of the article in 0.1 mm steps. FIG. 2a shows a stainless steel article 40 marked with laser parameters as shown in Table 1 with the height of the laser spot above the workpiece set to 5.2 mm. This image shows an area that has been marked with high spatial frequency ripples 42, along with an area that has not been marked 44. Clearly shown is a boundary 46 between grain areas or crystallites on the surface of the stainless steel. Grain boundaries 46 are interfaces where grain areas with different orientations meet. The overlaid scale 48 shows that the ripples have a period of about 10 nm and follow the grain boundaries 46. FIG. 2b shows another portion of the same article 50 following marking with the same laser parameters except that the laser spot height above the article to be marked is reduced to 5.0 mm. FIG. 2b shows high frequency ripples 52, with a period of about 10 nm as indicated by the embedded scale 54. Due to the higher fluence, the ripples have spread more evenly over the exposed portion of the article. Note that grain boundaries 56 are still clearly visible.

Figure 2C:
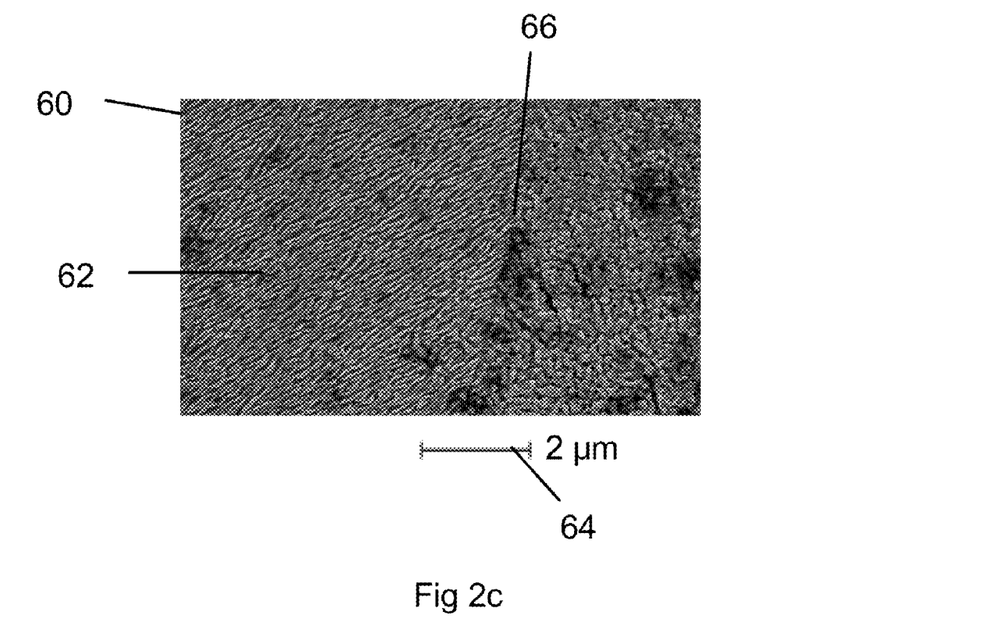
Figure 2D:
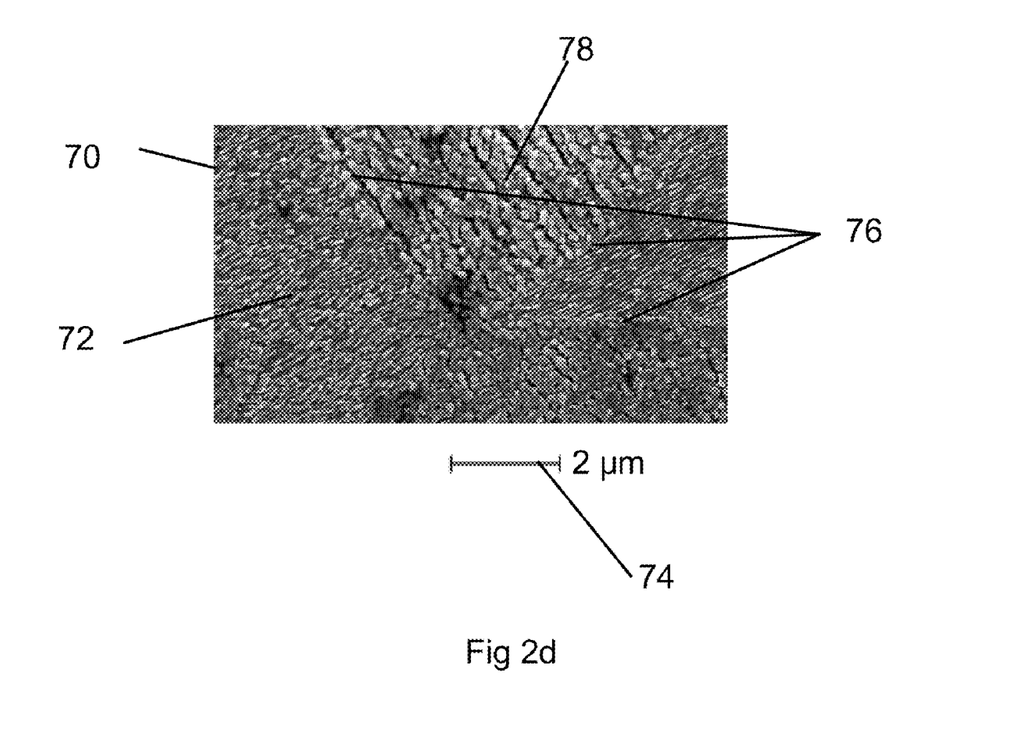

FIG. 2c shows another SEM image of an article marked according to an embodiment of this invention. This article 60 was marked using the laser parameters in Table 1, with the laser spot set 4.8 mm above the article. Clearly seen are high frequency ripples 62 with a period of about 10 nm as indicated by the scale 64. A grain boundary 66 is visible in this image. FIG. 2d shows another marked stainless steel article 70 marked according to laser parameters in Table 1, with the laser focal spot set 4.6 mm above the article's surface. High frequency ripples 72, with period of about 10 nm cover the entire marked area, except for the beginning of larger ripples 78 with spatial period of about 60-70 nm as indicated by the scale 74. Note that the grain boundaries 76 persist and that the direction of the large ripples is perpendicular to the direction of the high frequency ripples. The laser parameters listed in Table 1 and a laser spot height of 2.5 mm above the surface of a stainless steel article produce commercially desirable marks with uniform appearance throughout wide viewing angles with optical density equal to or less than about L*=20, a*=+/−2, and b*=+/−2 and represent optimal laser parameters for marking this particular sample of stainless steel according to an embodiment of this invention. Embodiments of this invention determine and use particular laser parameters which create relatively small, high frequency ripples that preserve the grain structure of the stainless steel while minimizing the creation of larger, lower frequency ripples which form perpendicular to the smaller, high frequency ripples and obliterate the grain structure of the metal surface. Use of these laser parameters to mark stainless steel yields uniform black marks with commercially desirable appearance and optical density less than about L*=20, a*=+/−2, and b*=+/−2 as measured on the CIE chromaticity scale.

Figure 2E:
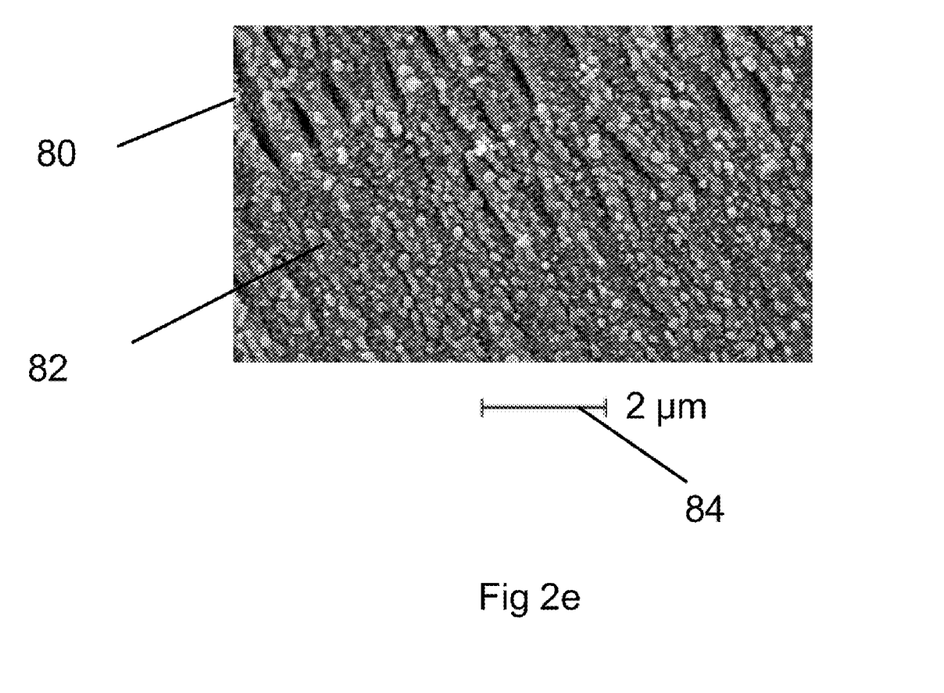

FIG. 2e shows a stainless steel article marked according to an embodiment of this invention with laser parameters as listed in Table 1 and a laser spot height of 4.3 mm above the surface of the stainless steel article 80. This image shows the effect of increasing fluence on the marks. At this fluence level, larger ripples 82 with period of about 800 nm are forming as indicated by the scale 84. The larger ripples 82 appear to form at right angles to the higher frequency ripples 42, 52, 62 and have spatial periods almost 10 times greater than the higher frequency ripples 42, 52, 62.

Figure 2F:
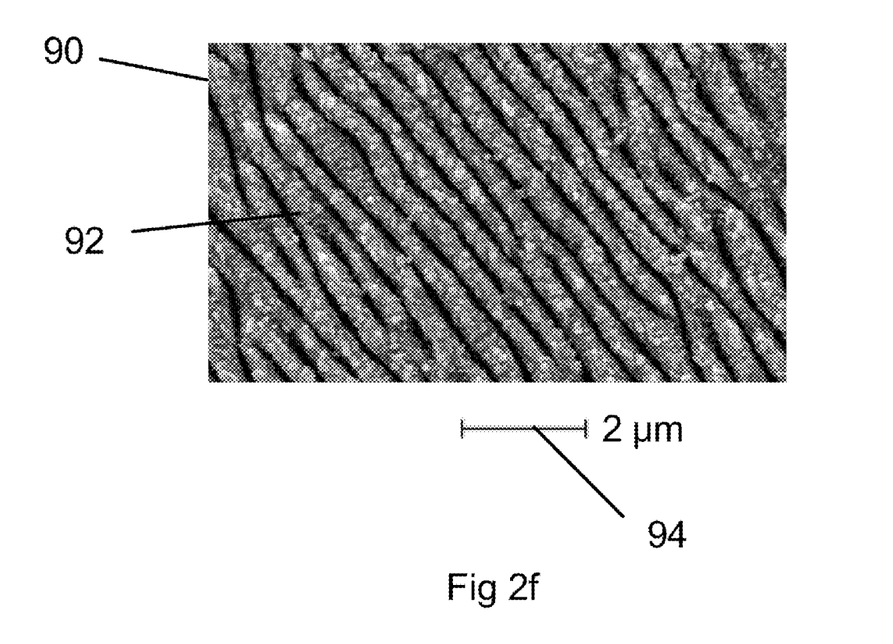

FIG. 2f shows a stainless steel article 90 having been exposed to laser pulses with laser parameters as listed in Table 1 with a focal spot height of 4 mm above the surface. Note that large ripples 92 are well organized and are perpendicular to the direction of the smaller, higher frequency ripples they replaced and have removed any indications of grain boundaries in the stainless steel. The scale 94 shows that these ripples have a period of about 800 nm. The surface markings in FIGS. 2e and f have been exposed to laser fluences in excess F$_r$, the lower fluence limit at which large ripples are organized on the surface of the stainless steel and do not represent optimal marks with desirable commercial properties. Commercially desirable black is defined as a mark having CIE chromaticity of L*=20, a*=+/−2, and b*=+/−2 or less.

Figure 3A:
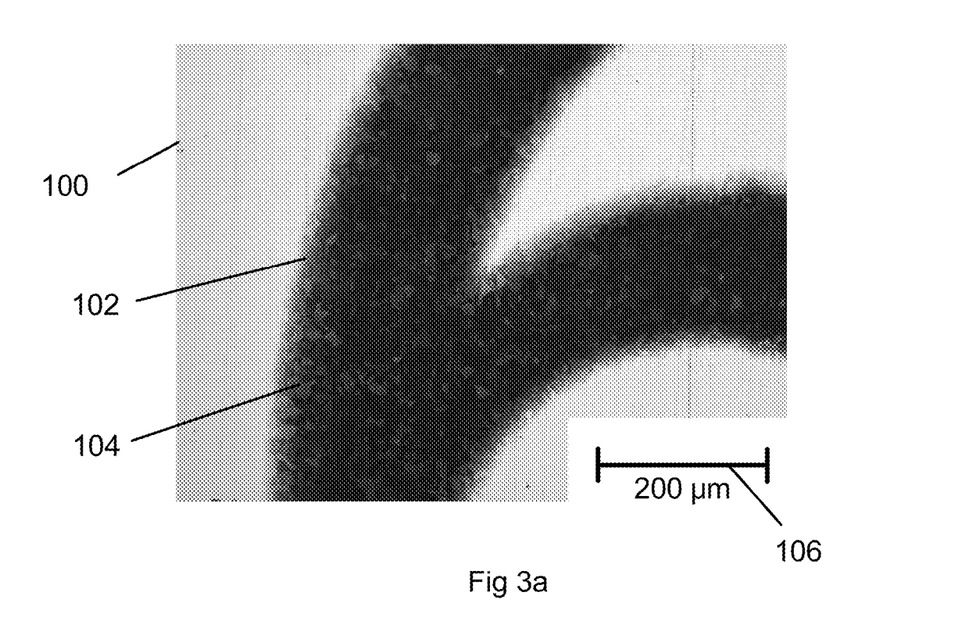
FIGS. 3a and b. Optical microscope images of laser mark on stainless steel.
Figure 3B:
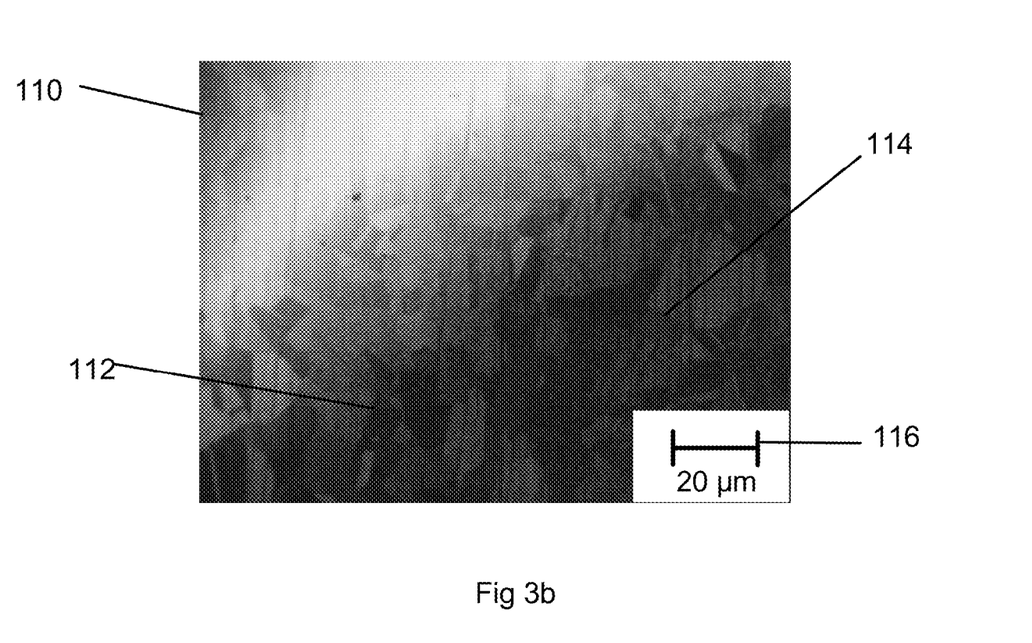

FIG. 3a is an optical microscopic picture of a region of a stainless steel article 100 with a laser mark 102 created according to embodiments of this invention. Laser parameters are as in Table 1 with a focal spot height of 4.6 mm. Note the clear presence of surface grain boundaries 104. Magnification is represented by the scale 106. FIG. 3b is an optical microscopic picture of a section 110 the same stainless steel article at a higher magnification 116, showing a mark 112 having grain boundaries 114 clearly visible.

Figure 4A:
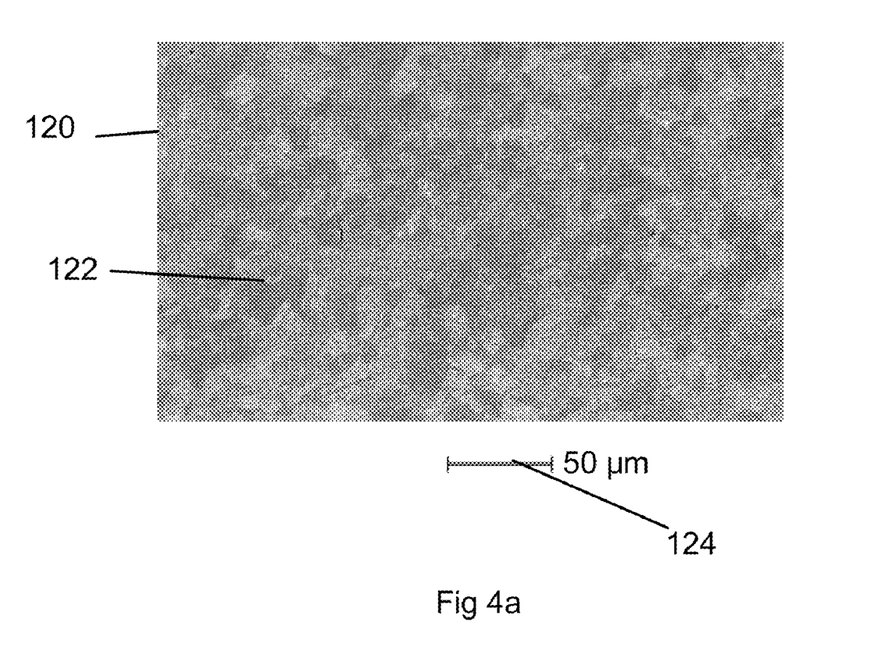
FIGS. 4a-d. SEM images of laser mark on stainless steel.
Figure 4B:
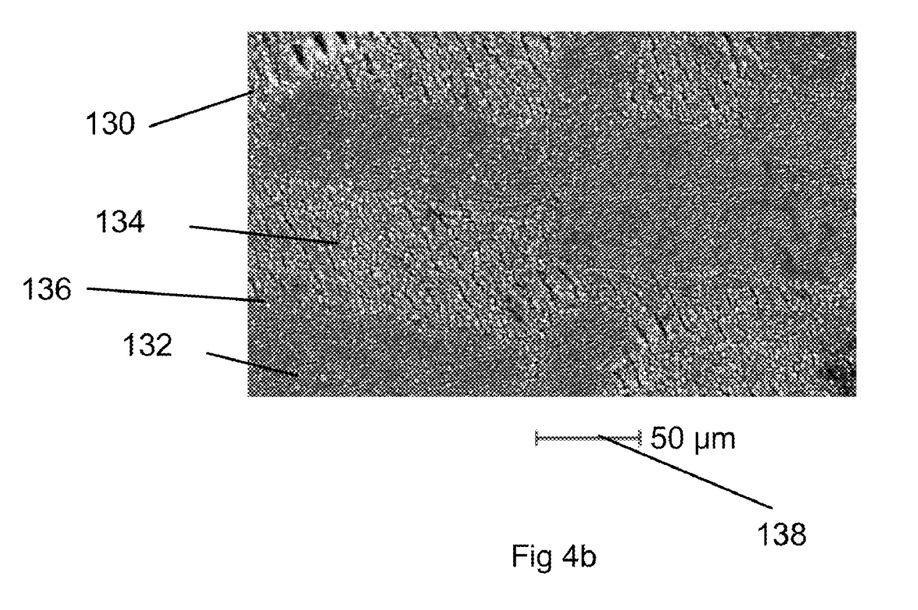
Figure 4C:
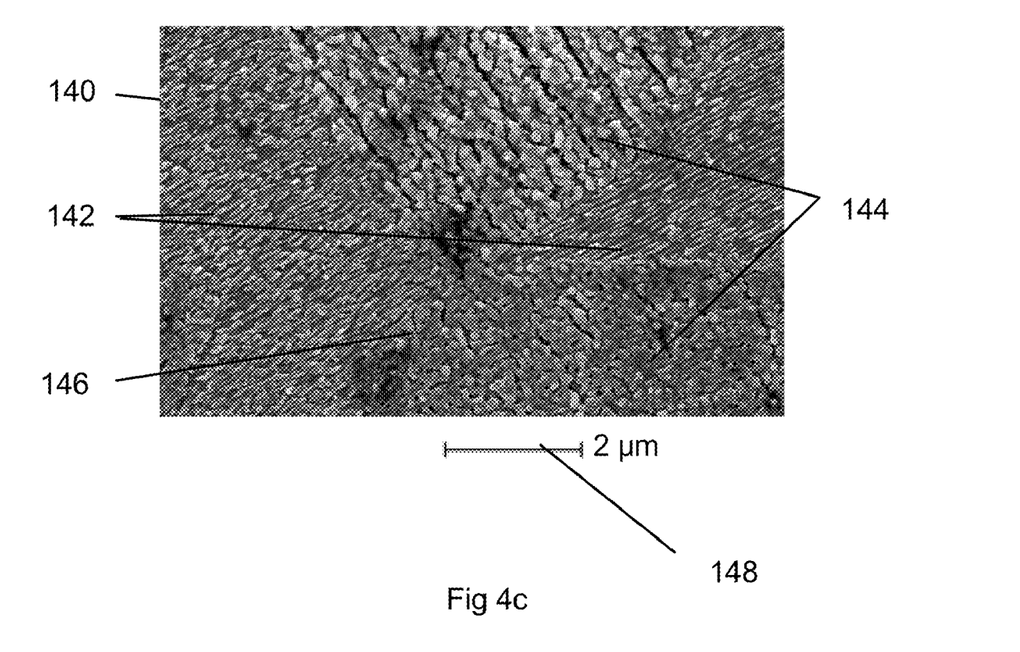
Figure 4D:
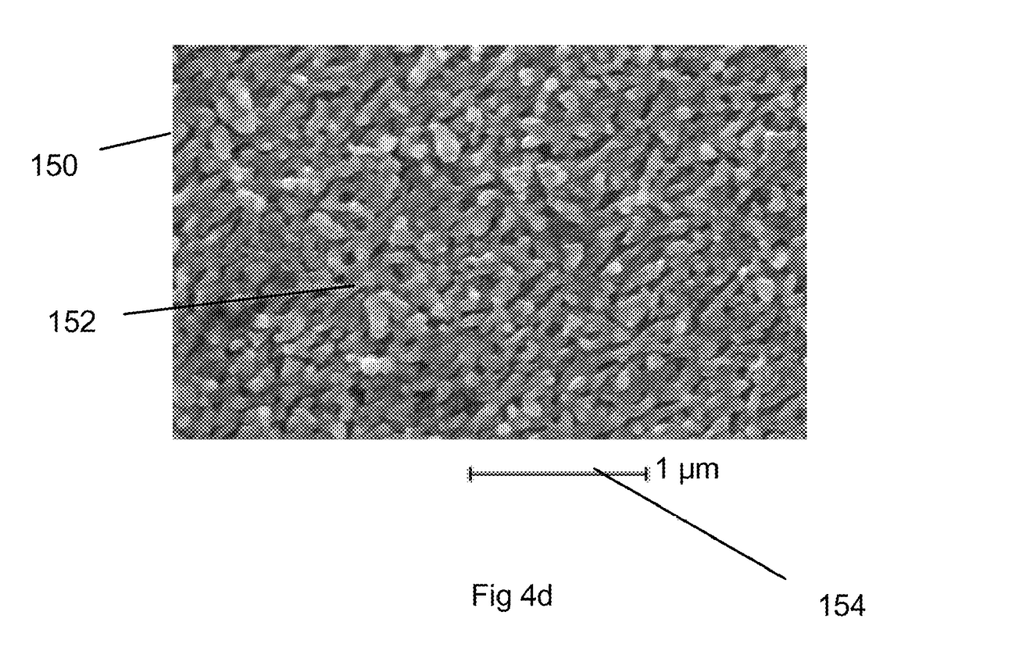

FIG. 4a is a SEM image of a region of a stainless steel article 120 marked according to an embodiment of this invention using laser parameters as shown in Table 1. This region 120 is marked with a uniformly commercially desirable black color and exhibits clearly defined grain boundaries 122. The magnification of this image is shown by the scale 124. FIG. 4b is an enlarged SEM image of a region of the same marked stainless steel article 130 shown in FIG. 4a at higher magnification 138. This region 130 shows areas with small, high frequency ripples 132 bordering areas where the small, high frequency ripples 132 are being partially organized into larger, low frequency ripples 134 at right angles to the high frequency ripples 132. Note that the grain boundaries 136 are generally visible. FIG. 4c is a SEM image of a region 140 of the same marked stainless steel article from FIGS. 4a and 4b acquired at a higher magnification 148, showing areas of small, high frequency ripples 142, areas where the small, high frequency ripples are being replaced by larger, low frequency ripples 144, and clear grain boundaries in between 146. FIG. 4d is an enlarged SEM image of a region 150 of the same marked stainless steel article shown in FIGS. 4a, b, and c, acquired at magnification 154. This image shows a region 150 of marked stainless steel with a surface texture 152 having small, high frequency ripples running from lower left to upper right, being replaced by large, lower frequency ripples running from lower right to upper left in the image. This process creates surface texture 152 having a nodular texture as shown, which contributes to the light trapping properties of the surface and thereby its black appearance. These images represent optimal marking parameters according to embodiments of this invention.

Figure 5:
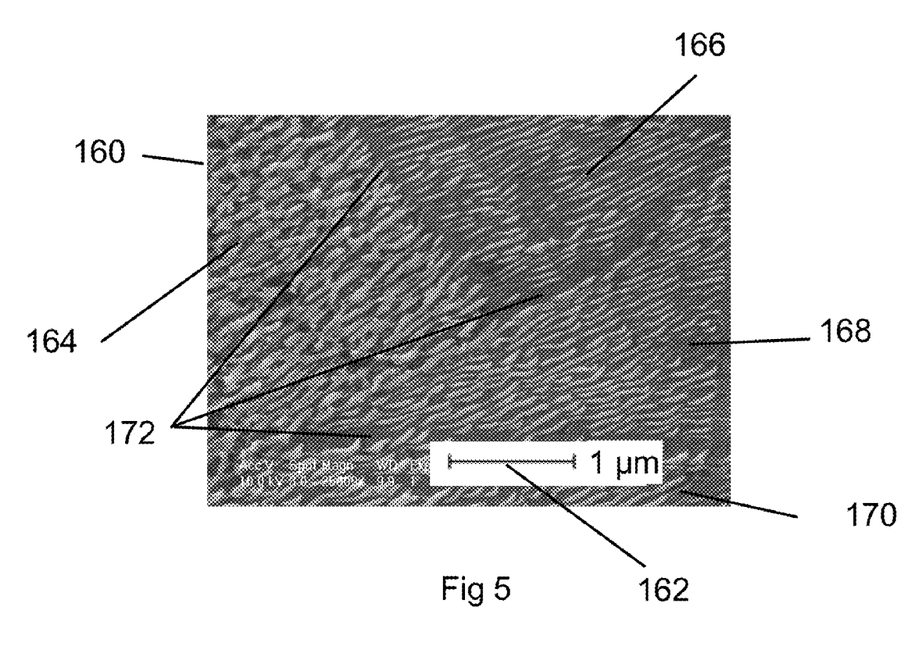
FIG. 5. SEM image of laser mark on stainless steel.

FIG. 5 is a SEM image of a region of a stainless steel article 160 marked according to an embodiment of this invention using laser parameters as shown in Table 1, acquired at a magnification indicated by the scale 162. In this image, the laser parameters have been adjusted to apply a fluence F just greater than the minimum fluence $F_u$ required to cause observable marking. Note the areas 164, 166, 168, 170 of small, high frequency ripples within defined grain boundaries 172. Also note the differences between amplitude of the ripples between area 164 and areas 166, 168 and 170 indicating a relationship between laser pulse polarization and crystal orientation in the metallic surface.

Figure 6:
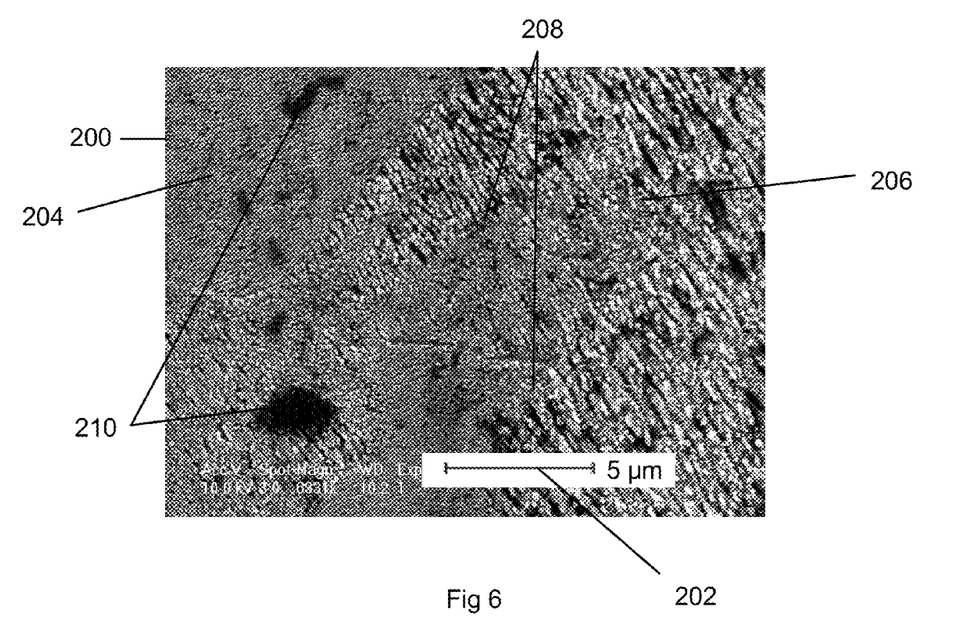
FIG. 6. SEM image of laser mark on stainless steel.

FIG. 6 is a SEM image of a region of a stainless steel article 200 marked according to an embodiment of this invention using laser parameters as shown in Table 1, except that the laser fluence has been adjusted to exceed the threshold at which large ripples begin to occur, $F_r$, and acquired at a magnification indicated by the scale 202. This image shows small, high frequency ripples 204 being replaced by large, low frequency ripples 206 at right angles to the former. Low frequency ripples, 206 are also obliterating grain boundaries 208. Also shown are craters 210 caused by ablation damage to the surface. At these points the laser fluence has exceeded the damage threshold $F_s$. These fluence levels result in marks with uneven appearance and limited viewing angles.

Figure 7:
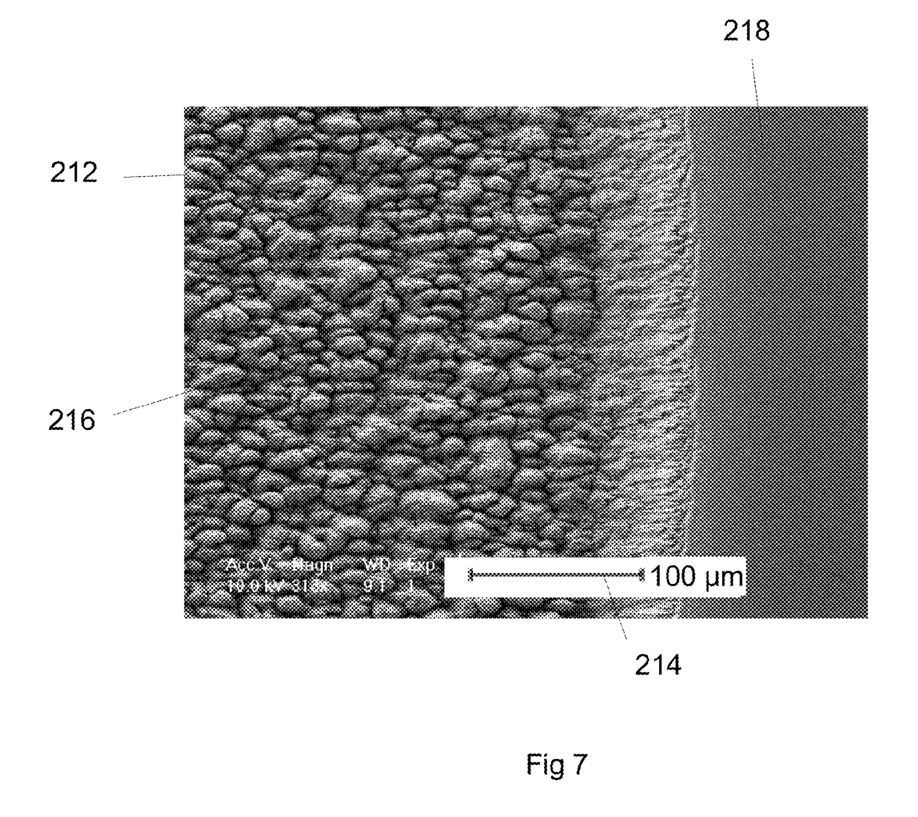
FIG. 7. SEM image of laser mark on stainless steel.

FIG. 7 is a SEM image of a region of a stainless steel article 212 marked according to an embodiment of this invention using laser parameters as shown in Table 1, except that the laser fluence has been adjusted to exceed the damage threshold of the stainless steel specimen, $F_s$, acquired at a magnification indicated by the scale 214. In this image, the laser parameters have been adjusted to provide a fluence F which greatly exceeds the damage threshold $F_s$ of the stainless steel article. This image shows ablation damaged area 216 adjacent to undamaged surface 218. Marks created with this fluence show extensive damage to the surface and irregular appearance.

Table 1 shows laser parameters used by an embodiment of this invention to create commercially desirable marks on stainless steel. Laser type refers to the technology used to generate laser pulses. In this embodiment, a diode pumped, solid state Q-switched Nd:YVO$_4$ laser is used to create laser pulses. Laser pulses which can be employed by embodiments of this invention can be created by other laser technologies, such as fiber lasers or combinations of solid state and fiber lasers. Wavelength refers to the wavelength of the laser pulses. Lasers typically produce substantially monochromatic pulses, where the wavelengths produced by the laser are all closely grouped around a single wavelength, in this case 1064 nm. Laser wavelengths can be altered by harmonic frequency generation, where non-linear crystals are used to double or triple the frequency of the laser, making the output pulses have wavelengths of 532 nm or 355 nm respectively. Frequency doubled or tripled laser pulses can be used by embodiments of this invention. The pulse duration refers to the temporal distribution of energy in the pulse. As mentioned above, pulse duration may be measured by a simple full width at half maximum (FWHM) measure for simple shapes such as Gaussian, or by the integral square method for more complex shapes. The laser power is measured by summing the power emitted by the laser over a period of time which encompasses several pulses and averaging the power to get a value for average laser power. Repetition rate (rep rate) refers to the rate at which laser pulses are emitted by the laser. Typically lasers exhibit an inverse relationship between laser rep rate and laser power, where the faster the pulse repetition rate, the lower the laser power per pulse.

Laser speed refers to the rate at which the laser beam moves with respect to the workpiece. We define the laser beam as the path that the laser pulses travel as they are emitted from the laser through the laser optics to the workpiece. An embodiment of this invention uses motion control stages upon which the article to be marked is fixtured in cooperation with laser beam steering optics to direct the laser beam to the workpiece in such a fashion as to cause the laser beam to move relative to the workpiece as the laser is pulsed. Bite size refers to the distance between successive laser pulses as measured on the surface of the workpiece. Bite size is a function of rep rate and laser speed.

Figure 8:
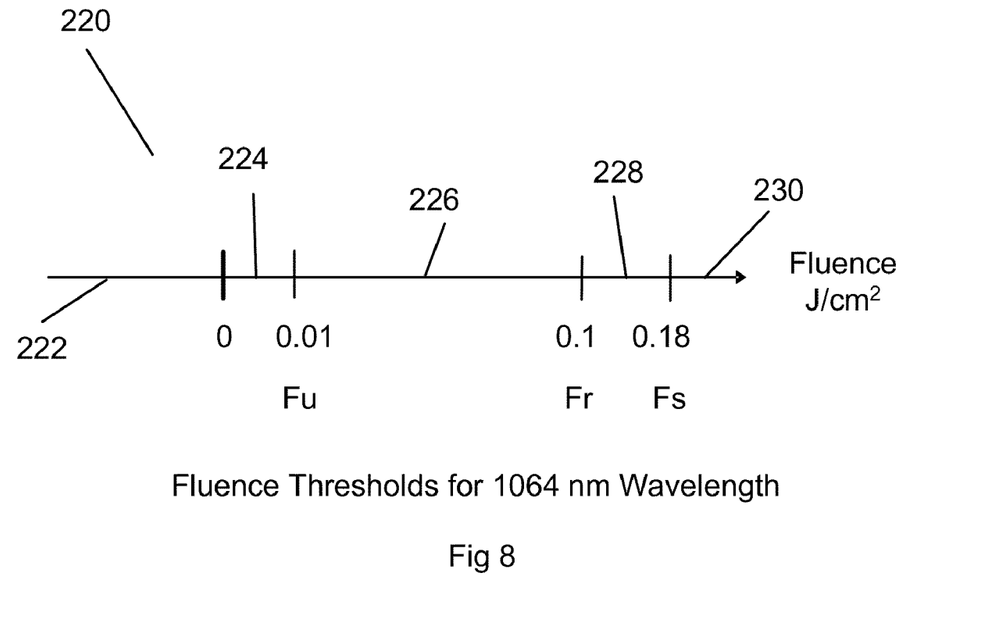
FIG. 8. Laser fluence chart.

An embodiment of the instant invention performs marking on stainless steel. For these marking to happen, the laser fluence must satisfy $F_u < F < F_r < F_s$, where $F_u$ is the laser modification threshold of the stainless steel substrate $F_r$ is the fluence at which large, low frequency ripples begin to replace small, high frequency ripples, and $F_s$ is the damaging threshold for the surface layer. $F_u$, $F_r$ and $F_s$ have been obtained by experiments and represents the fluence of the selected laser at which the substrate surface layer begins to show signs of being modified by the laser energy ($F_u$), where the large ripples start ($F_r$) and where damage that interferes with the marking begins ($F_s$). For 10 ps IR pulses, our experiments show that $F_u$ for stainless steel is about 47 mJ/cm$^2$, $F_r$ is about 62 mJ/cm$^2$ and $F_s$ is about 73 mJ/cm$^2$. FIG. 8 is a chart 220 showing the relationship between laser fluence 222, nonmarking 224, commercially desirable marking 226, non-desirable marking 228, and damage 230. Because of the difficulties in calculating and measuring dose, fluence is used as an indicating parameter, assuming that bite size and pitch are held constant. Holding bite size and pitch constant makes dose proportional to fluence. Different pulse durations and laser wavelengths, for example, would each have corresponding values of $F_u$, $F_r$ and $F_s$, which would have to be determined prior to processing. The actual thresholds to be used for these laser parameters may be determined experimentally. In the same fashion, different samples of stainless steel materials will react differently to the laser pulses, therefore the precise laser parameters to be used for a particular stainless steel article will be determined prior to processing.

Laser marking of stainless steel can also be achieved by an embodiment of the instant invention which uses picosecond IR wavelength laser pulses to mark the surface. This aspect creates marks of varying grayscale densities by varying the laser fluence at the surface of the stainless steel in at least two different manners. As discussed above, varying the fluence at the surface can be achieved by positioning the focal spot above or below the surface of the stainless steel. A second manner of controlling grey scale is to vary the total dose at the surface of the stainless steel by changing the bite sizes or line pitches when marking the desired patterns. Changing bite sizes refers to adjusting the relative position between successive pulses as the pulses are delivered as the laser beam is in relative motion to the article. Bite size can be adjusted by changing the laser repetition rate, the rate of relative motion between the laser beam and the article or both. Varying line pitches refers to adjusting the distance between marked lines to achieve various degrees of overlapping as the laser beam is scanned along adjacent lines. Fluence may also be varied by varying laser power, laser pulse duration or spot size among other laser parameters It will be apparent to those of ordinary skill in the art that many changes may be made to the details of the above-described embodiments of this invention without departing from the underlying principles thereof. The scope of the present invention should, therefore, be determined only by the following claims.

We claim:

1. A method for creating a mark on a metal specimen wherein the metal specimen has a fluence threshold above which the metal specimen tends to become ablated, the method comprising:
   providing a laser marking system configured to direct laser pulses onto the metal specimen at a controllable pulse fluence;
   determining laser pulse parameters associated with creating said mark on said metal specimen;
   storing said laser pulse parameters in said laser marking system; and
   controlling said laser marking system according to said stored laser pulse parameters to direct laser pulses onto the metal specimen at a pulse fluence below said fluence threshold thereby creating said mark.

2. The method of claim 1 wherein said mark is black.

3. The method of claim 1 wherein said metal specimen is stainless steel.

4. The method of claim 1 wherein said laser pulse parameters comprise pulse width, wherein said pulse width ranges from about 1 picosecond to about 1000 picoseconds.

5. The method of claim 1 wherein said laser pulse parameters comprise wavelength, wherein said wavelength ranges about 1.5 micron to about 255 nanometers.

6. The method of claim 1 wherein said laser pulse parameters comprise number of pulses, wherein said number of pulses ranges from 1 to about 10000 pulses.

7. The method of claim 1 wherein said laser pulse parameters comprise pulse temporal shape, wherein said pulse temporal shape is Gaussian.

8. The method of claim 1 wherein said pulse fluence ranges from $1.0 \times 10^{-6}$ Joules/cm$^2$ to 1.0 Joules/cm$^2$.

9. The method of claim 1 wherein said laser pulse parameters comprise spot size, wherein said spot size ranges from about 10 microns to about 1000 microns.

10. The method of claim 1 wherein said laser pulse parameters comprise spot shape, wherein said spot shape is one of Gaussian or Top Hat.

11. The method of claim 1 wherein said laser pulse parameters comprise spot height, wherein said spot height is above or below the surface of said metal specimen.

12. The method of claim 1 wherein said laser pulse parameters comprise bite size and pitch, wherein at least one selected from the group consisting of said bite size and said pitch ranges from 1 micron to 1 mm.

13. The method of claim 12 wherein at least one selected from the group consisting of said bite size and said pitch ranges from 1 micron to 100 microns.

14. The method of claim 1, wherein said pulse parameters comprise scan speed, wherein said scan speed ranges from 1 mm/s to 1 m/s.

15. The method of claim 14, wherein said scan speed ranges from 100 mm/s to 400 mm/s.

16. The method of claim 8, wherein said pulse fluence is about $5.0 \times 10^{-2}$ Joules/cm$^2$.

17. The method of claim 1 wherein said mark has an optical density equal to or less than about L*=20, a*=+/−2, and b*=+/−2 on the CIE chromaticity scale.

18. The method of claim 1 wherein said laser pulse parameters comprise spot height, wherein said spot height is at the surface of said metal specimen.

* * * * *